United States Patent Office 3,512,990
Patented May 19, 1970

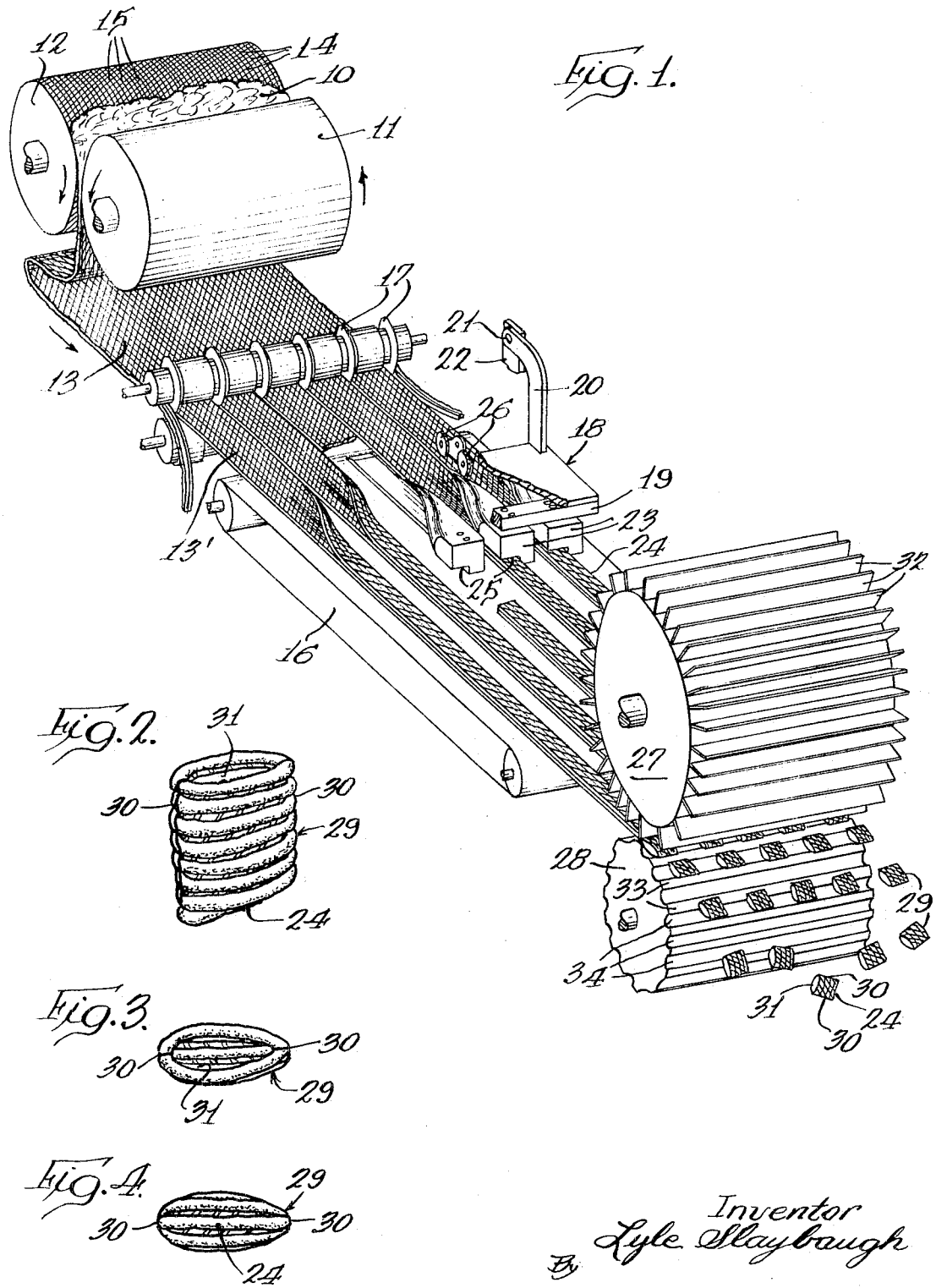

---

3,512,990
PRODUCTION OF SNACK PRODUCT
Lyle Slaybaugh, Battle Creek, Mich., assignor to Kellogg Company, Battle Creek, Mich., a corporation of Delaware
Filed Feb. 3, 1967, Ser. No. 613,930
Int. Cl. A21c *3/10;* A23l *1/10*
U.S. Cl. 99—81                                              4 Claims

ABSTRACT OF THE DISCLOSURE

Production of a fried snack food product by sheeting a dough, severing it into strips, folding the strips lengthwise, trasversely cutting and sealing the cut edges to form small biscuits closed on three sides, and then deep fat frying and thereby expanding them to cup-like form.

---

The present invention relates to the production of a crisp, fried dough product in the form of a scoop, cup or container, suitable for holding condiments or dips, and to the method and apparatus for producing same.

In general the process comprises feeding of a generally farinaceous dough between a pair of rolls, one of which may have protrusions or is formed with shaped grooves so that the rolled out dough is perforated in a predetermined pattern. Subsequently the sheeted dough is cut into strips of uniform width, folded lengthwise so as to provide doubled strips each with a rounded edge, and then segmented or cut into small biscuit-like units, say for example between about ¾″ and 1″ square, the cut edges being squeezed together so as to form a seal, and to thus produce units which are thus closed on three sides. These units are then subjected to deep fat frying wherein they are expanded to about twice their original size in each direction. Due to the folded edge, these units while expanding open up to form a cup or pocket-like article which permits the hot fat to penetrate between the superposed or over-folded layers, causing the product to puff open with frying, and this effect is aided when the sheets of dough have been pre-perforated. The resulting product is a highly desirable crisp snack food item, and as previously indicated can be used for scooping up dips or condiments or eaten without such additives.

The apparatus for accomplishing the foregoing comprises a pair of rolls which compact the dough into the form of a sheet and if desired simultaneously perforate the sheet; means for slitting the dough into strips of uniform width; means for lengthwise gradually folding the strip while it continuously moves forward; and means for segmenting the folded strip by transversely cutting and simultaneously sealing the cut edges to produce units closed on three sides. Frying to expand and complete the product is then carried out by deep fat frying apparatus such as is used in the production of potato chips.

The dough is conveniently made of farinaceous materials such as wheat, corn, oats, rice, potatoes, or legumes such as peas and beans, with suitable additives such as sucrose, salt, flavoring materials such as cheese or others, and conventional additives such as sodium bicarbonate, monosodium phosphate, disodium phosphate, and calcium carbonate, in minor amounts.

Since the product is to be subsequently deep fat fried the dough is not in all cases necessarily precooked but partial or complete cooking may be practiced before forming the dough.

Thus, for example, the dough may be prepared, in parts by weight, from approximately 85% corn flour, 5% oat flour, 4% salt, 4% sucrose, and minor amounts of other additives, and the mixture subjected to cooking with added moisture, say to an approximate moisture content of 30%. After cooking, the mixture is rendered homogeneous by either working it in a hammer mill such as a Fitz Mill, or passing it through an extruder such as an Ambrette extruder, and then dried to an approximate moisture content of 22–24%.

This dough is then compacted to sheet from between a pair of spaced rollers, one of which may be formed with a pattern so as to provide the dough with apertures as will be hereinafter described in connection with the accompanying drawings wherein:

FIG. 1 diagrammatically shows a perspective view of an arrangement of apparatus, with parts in section, of the present invention and for carrying out the process thereof.

FIG. 2 is a perspective view of the final product of the present invention.

FIG. 3 is a top plan view and FIG. 4 is a bottom plan view of the product shown in FIG. 2.

Thus referring to the drawings, the reference numeral 10 illustrates a body of dough disposed between the nip of the rolls 11 and 12. These rolls are suitably spaced for the desired thickness of the dough sheet 13. Although both of the rolls can be smooth, in the form illustrated the roll 11 is smooth whereas the roll 12 is formed with both annular grooves 14 and spiral grooves 15. This provides a shredding effect and produces a sheet of dough having diamond-like regularly spaced perforations, formation of perforated sheeted dough being per se well known in the art.

The issuing sheet 13 under the influence of conveyor 16 brings the dough under the rotary edging and slitter rolls 17 so as to divide the dough sheet 13 into a plurality of strips 13′ each of which is twice the width of the finally desired product. Each of the individual strips 13′ then continuously moves under the folder generally indicated as 18 which comprises a folder block 19 carried by the arm 20 and suitably pivoted as at 21 to a supporting body 22. The pivoted arm 20 permits the assembly of folder blocks to be elevated when desired to clear up collections of dough or "ball-ups" and also as an aid to original threading of the dough strips 13′ into the folders 23.

The folder body carries a plurality of contoured folding blocks 23 which receive and gradually fold the ribbons 13′ lengthwise so as to double them over and provide a rounded edge 24, the rear opening of the blocks 23 being notched as at 25 so as to leave the folded edge 24 rounded without creasing it, this rounded edge 24 being a characterizing feature of the present invention.

An aid in maintaining the ribbons 13′ in position, the folder 18 carries floating pairs of start wheels 26 adjacent each folder 23 to hold the ribbon 13′ in position as it begins to be folded to insure even folding and prevent undue slippage of the dough ribbons.

The folded ribbons 13′ then pass between a pair of rolls 27 and 28 where in they are segmented or severed into biscuits 29 having the folded edge 24 and the closed side edges 30, 30. Side edges 30, 30 are the severed edges of the folded strip 13′, and while being severed are squeezed together so as to close them and leave a rectangular unit having one side 31 which still remains open.

Segmenting is accomplished by the rolls 27, 28 by means of the radially projecting knives 32 which extend axially of the roll 27 and which abut on the anvil portions 33 on roll 28, the roll 28 being axially grooved at 34 between the anvils 33. Thus, when the folded strips of dough pass between the rolls 27 and 28, they are cut and edge sealed where cut by being squeezed together and the layers of dough merged thereat. The grooves 34 in the roll 28 permit the dough pieces to expand into the roll 27 in a manner similar to their ability to expand between the radial knives 32 on roll 27.

Thus, the units or biscuits 29 are provided with an opposed pair of sealed edges 30, 30 and a closed rounded edge 24 and an open edge 31.

The spaces between the flutes 34 are substantially equal to the width of a unit or biscuit and a bisciut takes on the shape of the groove 33 and becomes pillow-shaped which aids in its subsequent ability and tendency to expand by deep fat frying.

The biscuits 29 are then subjected to drying to a moisture content of about 10% by means of air heated to about 200° F. and thereafter subjected to deep fat frying by immersion in a bath of heated vegetable oil at a temperature of from about 360 to about 400° F. for a period of about one minute and then drained and permitted to cool and dry.

Due to the rounded edge 24 and the open edge 31 the biscuits open to receptacle-like form to permit the hot oil to penetrate between the layers and cause the product to greatly expand to say at least twice its size in each direction, the inside becoming fried as well as the outside.

Although I have shown and described the preferred embodiment of my invention, it will be understood by those skilled in the art that changes may be made in the details thereof without departing from its scope as comprehended by the following claims.

I claim:
1. The method which comprises severing a sheet of dough into a plurality of strips, folding the strips lengthwise to form a double thickness strip having a rounded longitudinal edge, and segmenting the strips by cutting them in a transverse direction and thereby causing compacting and sealing of said cut edges to form biscuits closed on three sides whereby when the resulting biscuits are heated they are caused to expand and open up under the influence of their rounded edges.

2. The method of claim 1 wherein the dough sheet is formed with a regular series of apertures before slitting.

3. The method of claim 1 wherein the biscuits are subjected to deep fat frying to cause them to expand and open up under the influence of their rolled edges.

4. The method of claim 1 wherein the dough is cooked farinaceous material and the sheeting, slitting, folding and segmenting is carried out in a continuous process.

References Cited
UNITED STATES PATENTS

| | | | |
|---|---|---|---|
| 1,473,289 | 11/1923 | Green | 107—54 |
| 3,310,006 | 3/1967 | Hasten et al. | 107—1 |

LIONEL M. SHAPIRO, Primary Examiner

J. R. HOFFMAN, Assistant Examiner

U.S. Cl. X.R.
99—88; 107—54, 69